United States Patent [19]

Huntress et al.

[11] 3,899,054

[45] Aug. 12, 1975

[54] DISC BRAKES WITH COOLING RODS

[75] Inventors: Howard B. Huntress, Suffern, N.Y.; Raymond J. Novotny, Sparta, N.J.

[73] Assignee: Abex Corporation, New York, N.Y.

[22] Filed: Feb. 8, 1974

[21] Appl. No.: 440,854

[52] U.S. Cl. ... 188/218 XL; 188/264 A; 192/113 A
[51] Int. Cl. ............................................. F16d 65/10
[58] Field of Search .. 188/218 XL, 264 A, 264 AA, 188/71.6; 192/113 A

[56] References Cited
UNITED STATES PATENTS

| | | | |
|---|---|---|---|
| 2,215,421 | 9/1940 | Eksergian | 188/218 XL |
| 2,345,016 | 3/1944 | Tack | 188/218 XL |
| 3,391,763 | 7/1968 | Severson | 192/113 A X |

FOREIGN PATENTS OR APPLICATIONS

| | | | |
|---|---|---|---|
| 1,164,455 | 3/1964 | Germany | 188/264 A |

*Primary Examiner*—George E. A. Halvosa
*Attorney, Agent, or Firm*—Kinzer, Plyer, Dorn & McEachran

[57] ABSTRACT

Disc brake structure which includes a rotor presenting two spaced walls with a plurality of rods connected to the interior surfaces thereof so that air passing from the center of the rotor between the interior surfaces of the rotor walls and outward from the rotor is constrained to follow a substantially tortuous path.

3 Claims, 10 Drawing Figures

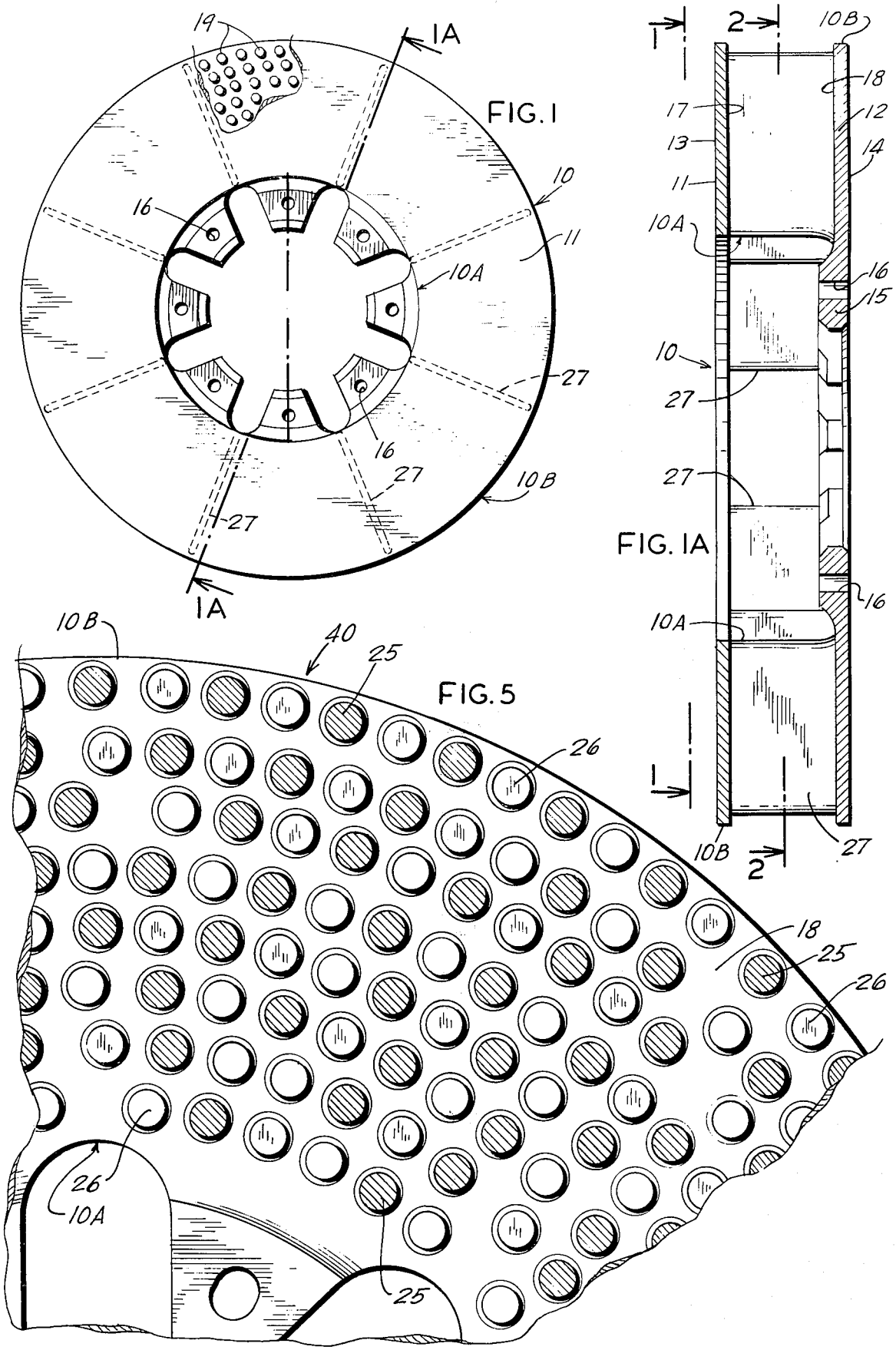

DISC BRAKES WITH COOLING RODS

BACKGROUND OF THE INVENTION

This invention relates to disc brakes and more particularly concerns a way of increasing the cooling capacity of disc brakes in high heat transfer applications.

Today, rapid transit systems which are being designed and installed involve high speed, heavy cars making frequent stops. Disc brakes have become a popular braking means due to their excellent heat transfer. In some automobile disc braking systems, for example, a solid disc is sufficient since its heat capacity can easily absorb the necessary kinetic energy; however in heavier vehicles such as rapid transit cars dual walled disc brakes are used due to their increased performance capabilities. Increasing the rotors to large sizes to dissipate the heat over a broader area is one method of reducing the operating temperature of the disc brake, but it is subject to the penalty of increasing the weight of the railroad car.

It is therefore an object of the invention to design a disc brake rotor which will quickly dissipate heat and which at the same time will reduce the overall weight of the brake.

A related object is to design a disc brake rotor with surfaces which will cool more rapidly than heretofore, making frequent stops possible without high operating temperatures which lead to brake fade or excessive brake wear. This is of particular advantage in rapid transit systems where frequent stops are made.

Another object of the invention is to provide a simple integral cast disc rotor which can be cast in a one step operation from a single alloy.

SUMMARY OF THE INVENTION COMPARED TO SOME KNOWN STRUCTURES

In accordance with the invention, a disc brake rotor is provided having a pair of spaced wall members presenting external braking surfaces and opposite internal surfaces connected by a plurality of rods which are so spaced one from another that movement of air from the inner circumference of the rotor between the internal surfaces of the walls and outward from the outer circumference of the rotor is incapable of following a substantially straight line path but to the contrary is constrained to follow a tortuous path.

U.S. Pat. No. 2,701,626 discloses a disc brake in which a few isolated cooling rods are disposed between the rotor walls; however the major portion of the cooling air is capable of passing in a straight path outward from the center of the rotor. The disc brake of U.S. Pat. No. 3,391,763 embodies a combination of rods and vanes between the rotor walls; however a substantial portion of the cooling fluid is still capable of moving from the inner circumference of the rotor member to the outer circumference of the rotor member along a straight path. Moreover, in U.S. Pat. No. 3,391,763 the cooling inserts do not extend continuously between the interior surfaces of the walls of the rotor so the entire center portion presents no constraining influence on cooling fluid traveling through the center of the rotor between the walls.

BRIEF DESCRIPTION OF THE DRAWINGS

In the Drawing:

FIG. 1 is a plan view of a disc brake rotor assembly constructed in accordance with the present invention, partially fragmented to reveal internal features;

FIG. 1A is a sectional view of the assembly shown in FIG. 1 taken substantially on the line, 1A—1A of FIG. 1;

FIG. 5 is a fragmented sectional view of a second embodiment of the present invention;

DETAILED DESCRIPTION: RAILROAD USAGE

Figure 3:
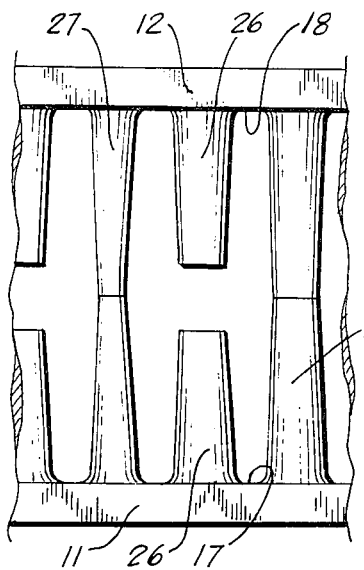
FIG. 3 is a partial side view of the assembly of FIG. 2 taken along line 3—3 of FIG. 2.

FIG. 1 shows a partially fragmented plan view of a rotor assembly 10 of the present invention. As seen in conjunction with FIG. 1A, a pair of walls 11 and 12 are shown. Each wall has external braking surfaces 13 and 14 and at least one of the wall members has a central portion 15 which can be mounted to a wheel. This is easily done through the use of bolt holes 16 and bolts (not shown) or any other conventional manner. In operation, braking pads clasp the exterior braking surfaces 13 and 14 and stop the rotating disc and wheel by exerting pressure against the surfaces 13 and 14 which is converted into heat energy which must be dissipated by the rotor or the wall members. The wall members are connected together on their interior surfaces 17 and 18 respectively by a plurality of connecting rods 19 and vanes 27. The connecting rods 19 have been omitted in FIG. 1A for clarity.

Figure 4:
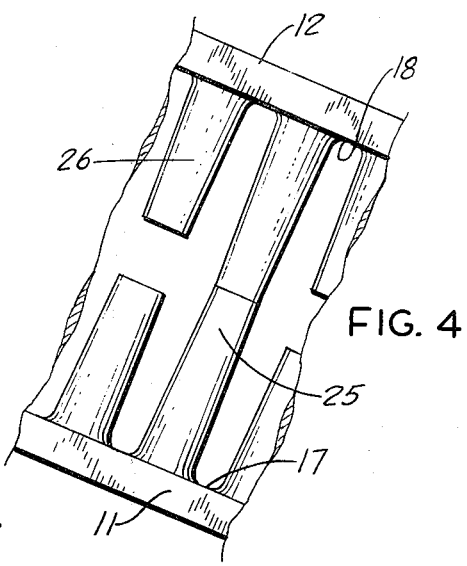
FIG. 4 is a partial side view of the assembly of FIG. 2 taken along line 4—4 of FIG. 2.
Figure 2:
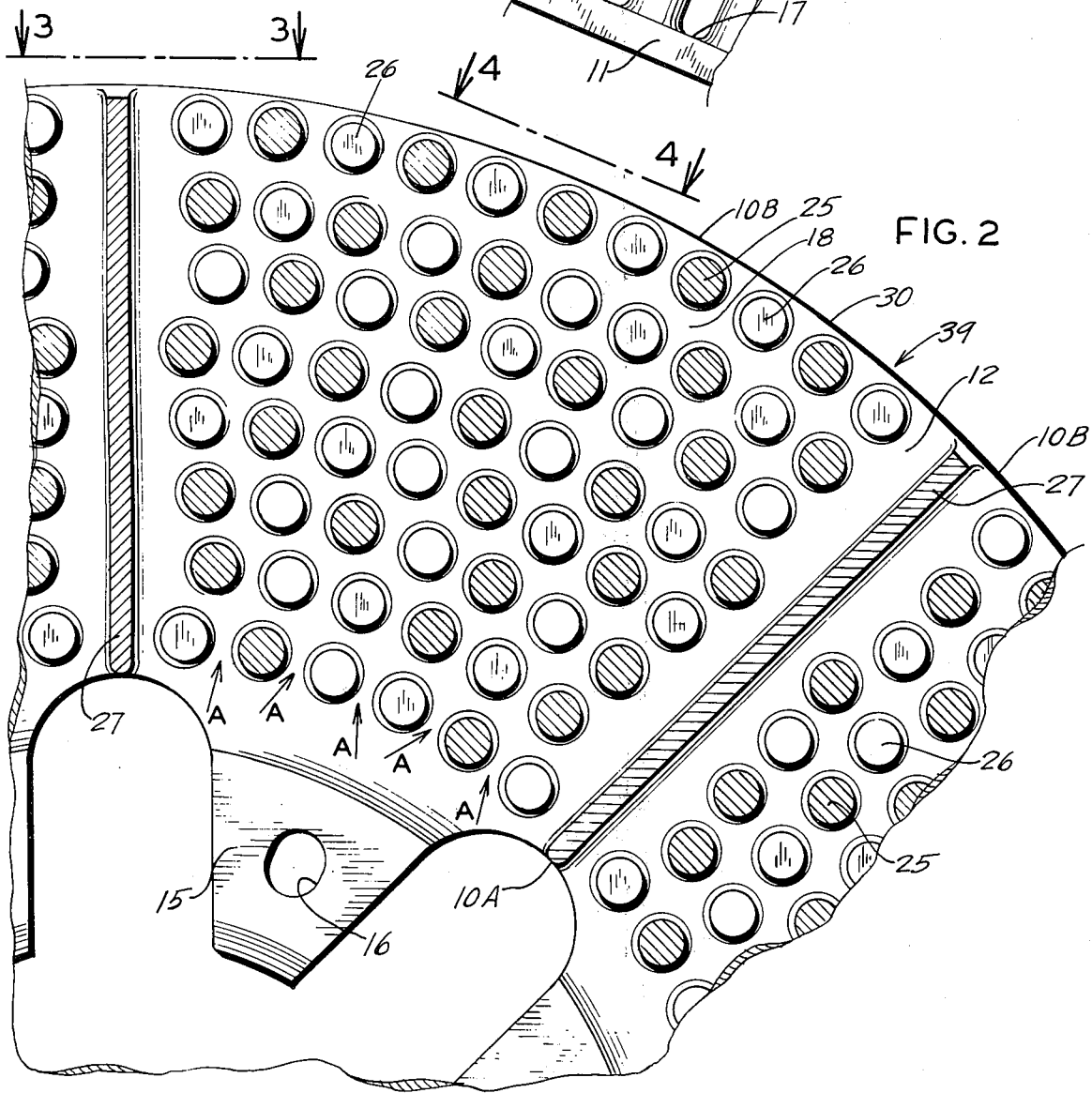
FIG. 2 is a fragmented sectional view of one embodiment of the present invention taken along line 2—2 of FIG. 1A.

FIG. 2 clearly depicts the internal rods. As can be seen in conjunction with FIGS. 3 and 4, there are connecting rods 25 which connect the interior surfaces 17 and 18 of the wall members and truncated rods 26 which do not connect both surfaces 17 and 18. The truncated rods 26 are shortened whenever possible to decrease the weight of the disc brake and the preferred construction uses only the amount of connecting rods 25 necessary to provide adequate strength to connect the two walls together and modify fluid flow as described Also shown are connecting vanes 27 which further increase the strength of the connection between the wall members 11 and 12. It should be noted that the rods are so spaced that any fluid moving in the direction of the arrows A or any other set of random arrows is constrained to follow a tortuous path. Thus, the flow of cooling air is substantially incapable of following a straight line path since the rods are spaced or sized so that substantially all straight paths from the inner circumference 10A to the outer circumference 10B of the rotor are blocked by rod surfaces.

A second embodiment of the invention is seen as 40 in FIG. 5 which is similar to FIG. 2 except that the connecting vanes 27 are replaced by additional connecting rods 25 and truncated rods 26. The second embodiment 40 shown in FIG. 5 accomplishes a similar purpose as the embodiment 39 shown in FIG. 2; thus movement of air from the inner circumference 10A of the rotor member to the outer circumference 10B of the rotor member is constrained to follow a tortuous path.

In construction of the disc assembly of the present invention, it is possible to cast the entire disc assembly as one piece. This accounts for the rods 25 and 26 and vanes 27 being tapered as this aids the casting of the piece. It is possible to have the rods more cylindrical than shown or of other shapes if other procedures are used in casting.

Although the rods are shown in a circular crosssection form, it should be apparent that any shape rod or combinations of shapes would be sufficient for the invention as long as the fluid or cooling air moving outward from the center of the rotor is constrained to a tortuous path. Thus the cooling rods could be hollow, or a hollow tube or solid tube in a sectional V-shape, Y shape with three fins, or a four finned cruciform. Other shapes and degrees of hollowness may be chosen but the preferred method of construction includes circular rods or tubes.

While the rods in the present embodiments are shown as staggered from a radial line, it should be apparent that as long as the rods constrain the cooling fluid to substantially tortuous paths they can be staggered radially, circumferentially, or both radially and circumferentially. The rods could be staggered randomly as long as the cooling fluid is constrained to travel along a tortuous path. Also, the rods can be of various sizes or shapes to accomplish this constraint, allowing greater efficiency of heat transfer to the ambient atmosphere compared to disc assemblies using only the flat surface of conventional vane spacers or strengtheners, or in any instance where the flow of cooling air is along an essentially unimpeded straight line path; calculations show an improvement of the order of five-to-two. Correspondingly, a decrease in operating temperature of a disc brake using staggered rods in place of vanes as herein disclosed is expected to be around 100°F. For a railroad brake disc, there is also a decrease in weight in the staggered rod discs of the present invention of 35 pounds from a flat vane disc of the same diameter; thus the overall size of a disc using the present invention could be decreased or a superior performance obtained depending on the desired design characteristics for the braking system.

Although in the preferred embodiment a one piece integral casting can be obtained from a single alloy, it would be possible within the scope of the invention to use different alloys for the braking surface rotor members, and the connecting rods and cooling rods. Thus, a high heat conductive metal rod such as steel, Armco iron (a very low carbon iron of high conductivity), copper or aluminum could be set between the regular alloy braking surface wall members and a corresponding increase in heat transfer would be obtained. One manner of doing this is to coat steel rods with copper, set the rods in a mold and cast the iron around the ends of the rods.

Another feature of the invention, in the embodiment without any vanes extending the entire radial length of the rotor walls, is to angle the array of cooling rods along the profile of a forwardly curved blower vane so as to exert a propeller force against the cooling fluid, accelerating the cooling fluid outward from the center of the rotor. Thus, the blowing effect of vanes may be realized in the absence of vanes which is of particular advantage in automotive use as will now be explained.

Automotive Use

Figure 6:
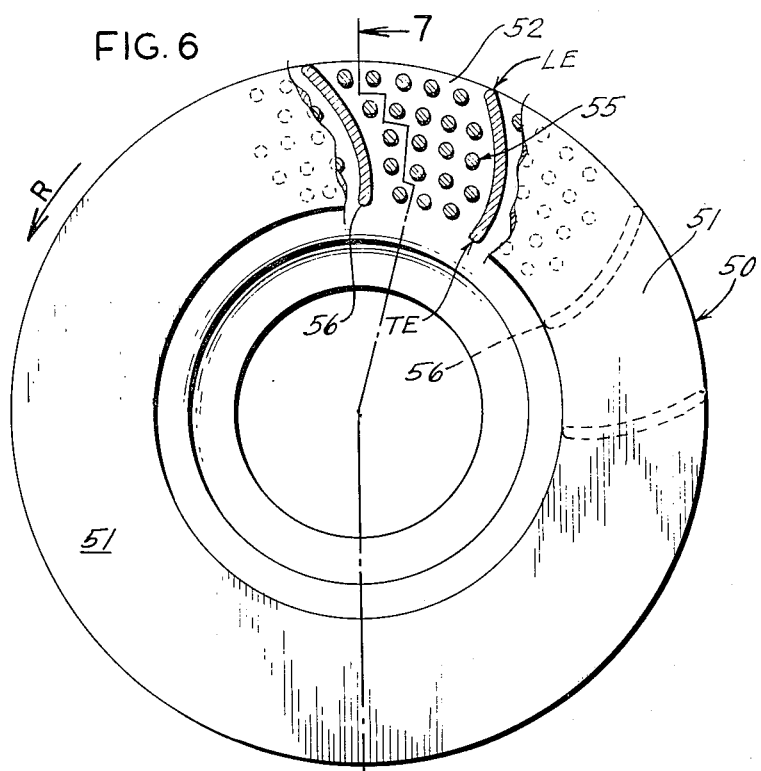
FIG. 6 is a plan view, partly fragmented, of a modified form of the invention.
Figure 7:
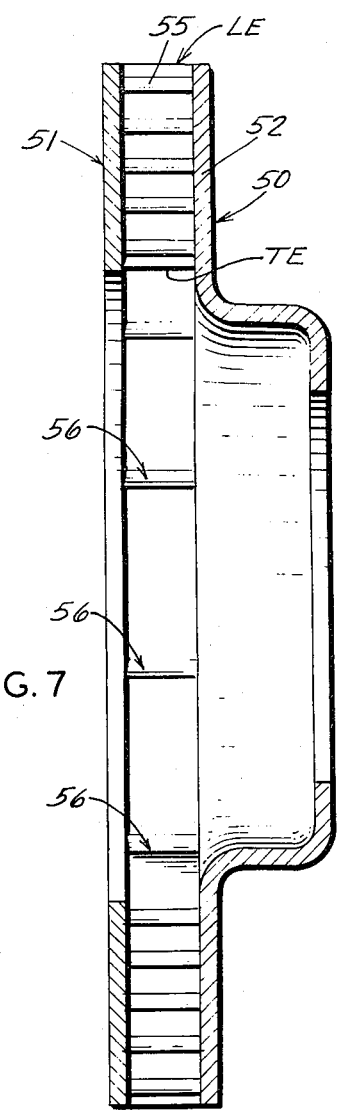
FIG. 7 is a sectional view on the line 7—7 of FIG. 6.

For all intents and purposes, so far as concerns dissipating heat produced during braking, an automotive vehicle has forward motion only. FIG. 6 is a sectional (scaled) view of a brake disc rotor 50 for an automobile of standard manufacture; FIG. 7 is a sectional view on the line shown. The rotor walls 51 and 52 are joined at the inner surfaces by spaced rods 55 radomly distributed both circumferentially and radially so as to subscribe to the principle disclosed above, and accordingly all routes for air moving radially outwardly are constrained to follow a tortuous path repeatedly obstructed by rod surfaces. Additionally the rotor walls are joined by curved spacer vanes 56 having the radial outer end LE in a leading direction while the radial inner end TE is in a trailing position. Accordingly an impeller or "throwing" effect is exerted on the cooling air, accelerating air flow. Rotation of the rotor (forward motion of the automobile) is shown in arrow R. It may be noted in FIG. 6 and FIG. 9 that displacement and orientation of the vanes are such as to lean forward in the direction of rotation.

Figure 8:
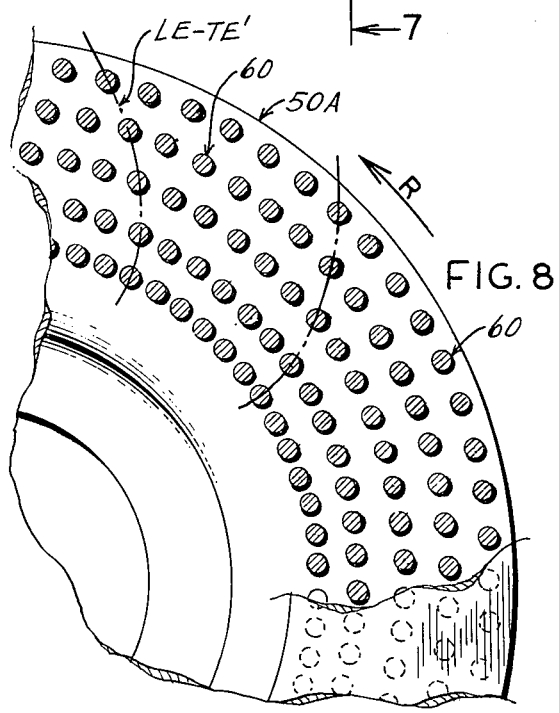
FIGS. 8 and 9 are, respectively, fragmentary detail views of still further modified forms of the invention.

A fragment of a modified rotor is shown at 50A, FIG. 8, similar in all respects to the rotor 50 except the cooling rods 60 are arranged in five circles of progressively larger radius, equally spaced, such that a curved line can be drawn through five radially adjacent vanes, a line identical to the center line of an imaginary vand (as 56) in the same location. The center line is marked LE-TE to indicate the rods are arranged in the leading sense of the vanes 56, FIG. 6. To present an idea of numbers, the rotor shown in FIG. 6, actual manufacture, is: 12 inches OD, 7 ½ inches ID, 1 ¼ inches wide with two walls ¼ inch thick. In the modification shown in FIG. 8, there will be three hundred and sixty rods, each radial set of five on a line LE-TE collectively producing an impeller effect and the principle of induced tortuous air flow is preserved.

Figure 9:
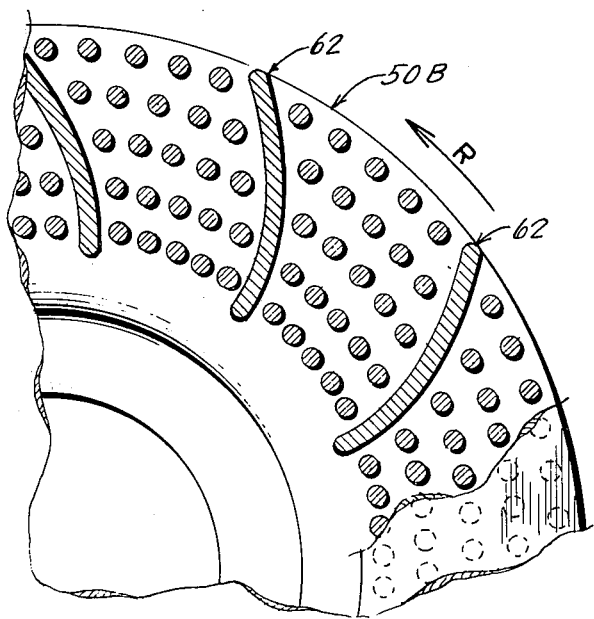

The modification rotor 50B, FIG. 9, is identical in all respects to the rotor 50A except that curved vanes 62 supplant some of the rods.

Thus it is apparent that there has been provided, in accordance with the invention, a disc brake rotor that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. In a cast disc brake rotor for dissipating heat incidental to braking comprising a pair of spaced walls, each presenting an exterior braking surface and an opposite interior surface, and a plurality of connecting rods rigidly connecting said interior surfaces and maintaining the fixed positional relationship therebetween, the improvement comprising:
 a plurality of separated truncated rods cast integral with the rotor and protruding from each of the interior surfaces, said connecting rods and truncated rods being interspersed generally uniformly between the inner circumference and outer circumference of said interior surfaces and staggered relative to one another to constrain fluid passing outwardly between said walls to follow a tortuous path.

2. The brake rotor of claim 1 further comprising a plurality of generally radially directed vanes joining said interior surfaces and further characterized in that the connecting rods and truncated rods are irregularly spaced from said vanes, to induce turbulence in the flow of fluid passing therebetween.

3. The brake rotor of claim 2 further characterized in that at least one truncated rod is interposed between circumferentially adjacent connecting rods.

* * * * *